Patented Mar. 11, 1947

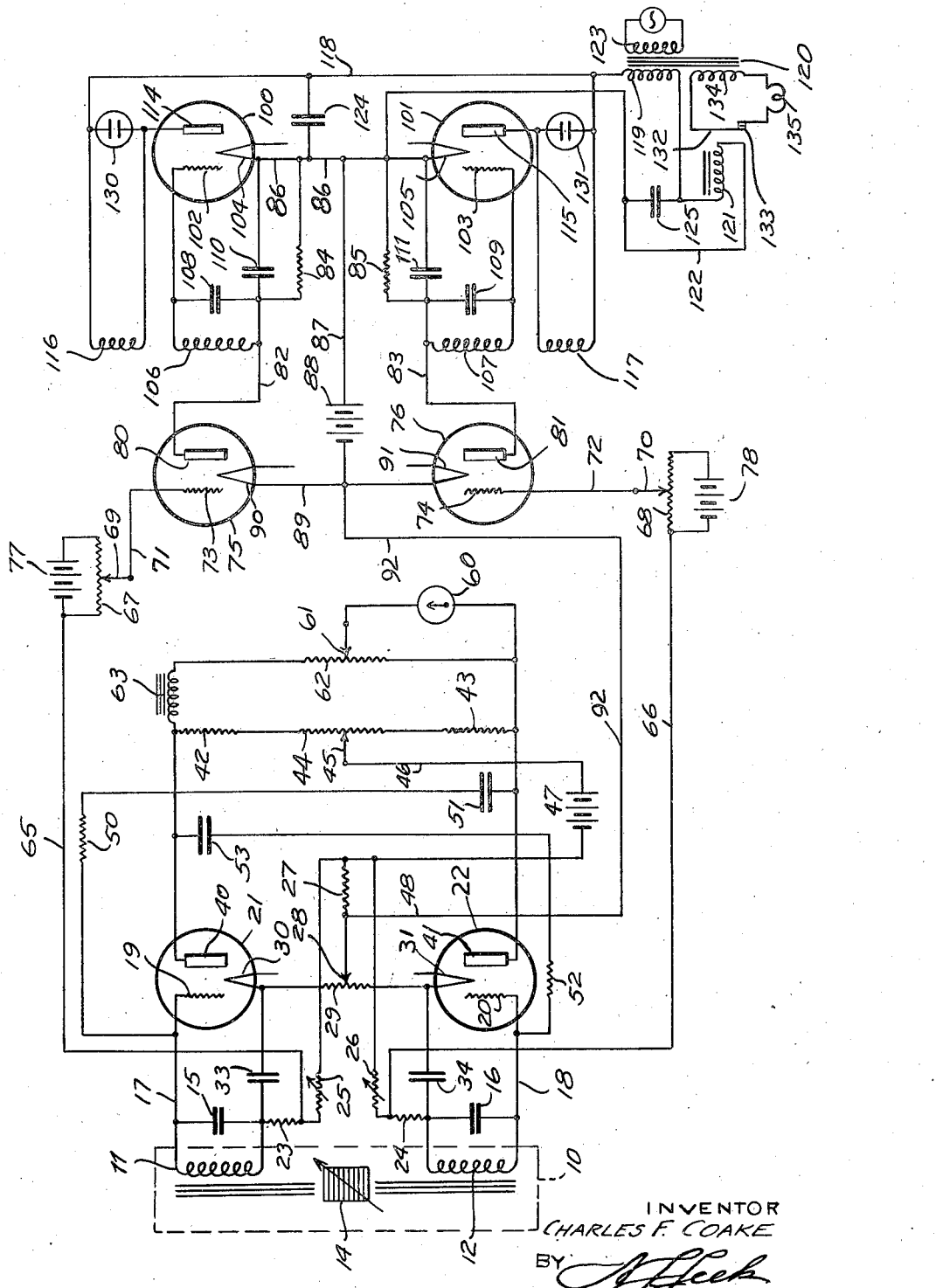

2,417,292

UNITED STATES PATENT OFFICE 2,417,292

MICROLIMIT INDICATING SYSTEM

Charles F. Coake, Indianapolis, Ind., assignor to Senn Corporation, New Augusta, Ind., a corporation of Indiana Application February 24, 1945, Serial No. 579,627

13 Claims. (Cl. 177—311)

1

This invention relates to a microlimit indicating system responsive to micro-changes in an applied voltage.

The system may be applied, for example, to electric microgauge circuits to provide a visual indication whenever variations in the characteristics of the article being measured exceed a predetermined limit of tolerance, or to other circuits which require a response to extremely small variations in potential, such as a thermo-couple system or a photoelectric control circuit or the like. The system is also useful for operating relays to produce, for example, an extremely sensitive follow-up system.

An object of the invention is to provide a system of the above type which is extremely sensitive and dependable in operation and has novel and improved characteristics.

Another object is to provide a system of the above type which is suited to the rapid measurement of production items by comparatively unskilled operators so that parts may be gauged to a close tolerance with extreme accuracy.

Various other objects and advantages will be apparent as the nature of the invention is more fully disclosed.

The limit indicating system in accordance with the present invention includes a pair of space discharge oscillators the operation of which is controlled by a variable grid bias. The grid bias of each oscillator is controlled by the output circuit of an amplifier tube the input circuit of which is connected to the potential to be measured, for example, to the variable potential points in an electric microgauge circuit.

An indicator such as a glow lamp is connected to be energized when the oscillators are operating or in certain instances relays may be connected in the output circuits of the oscillators to be actuated when the space current therein exceeds a predetermined value.

In the specific embodiment disclosed the microlimit circuit is connected to a point of variable potential in an electric microgauge circuit of the type disclosed in my co-pending application Ser. No. 578,320, filed Feb. 16, 1945. This system comprises a variable impedance device having a pair of coils, the impedance of which is varied in an opposite sense by means of an armature which is actuated by the quantity being measured. The coils are connected to form parts of the input circuits of a pair of tubes connected for balanced operation and are arranged to effect changes in grid current of the two tubes corresponding to the changes in impedance of the respective coils. These changes in grid currents produce voltage variations in a circuit element which are applied to the input circuits of the amplifier tubes which control the oscillators. The control is such that a predetermined movement of the armature from its mid-position renders a selected oscillator operative and energizes the corresponding glow lamp. Hence the glow lamps indicate limits of variation in the quantity being measured.

Although the novel features which are believed to be characteristic of this invention are pointed out more particularly in the claims appended hereto, the invention will be better understood by referring to the following description, taken in connection with the accompanying drawings in which a specific embodiment thereof has been set forth for purposes of illustration.

The drawing is a schematic diagram of a microgauge limit circuit embodying the present invention.

Referring to the drawings more in detail, the circuit is shown in connection with a measuring head 10 having a pair of coils 11 and 12 which are of the variable impedance type and are coupled by means of an armature 14 which is movable in response to a stylus to be actuated by the quantity being measured to cause variations of an opposite sense in the impedances of the coils. Condensers 15 and 16 are connected across the respective coils 11 and 12 and form tuned circuits which are resonant at a predetermined frequency. The coils 11 and 12 are connected by lines 17 and 18 with grids 19 and 20 of a pair of triodes 21 and 22 and by fixed resistors 23 and 24 and variable resistors 25 and 26 respectively and a common resistor 27 in series to a tap 28 on a potentiometer 29, the ends of which are connected to the cathodes 30 and 31 respectively of the tubes 21 and 22. By-pass condensers 33 and 34 are connected across said resistors to the respective cathodes 30 and 31.

The tubes 21 and 22 are provided with anodes 40 and 41 which are connected across opposite ends of a resistor network comprising fixed resistors 42 and 43 and a potentiometer 44 connected in series. The variable tap 45 of the potentiometer 44 is connected by a line 46 to the positive side of a source 47 of plate potential, the negative side of which is connected by a line 48 to the junction between the resistor 27 and the resistors 25 and 26. The grid 19 of the tube 21 is connected through a resistor 50 and a condenser 51 to the plate 41 of the tube 22. The grid 20 of the tube 22 is connected by a resistor 52 and a condenser 53 to the plate 40 of the tube 21. Resistors 50 and 52 and condensers 51 and 53 constitute cross-connected feedback networks which couple the tubes 21 and 22 for oscillation in unison as a push-pull oscillator at a frequency determined by the tuned circuits including the coils 11 and 12 and condensers 15 and 16.

When the impedances of the coils 11 and 12 are such that the tuned circuits have identical characteristics, the push-pull oscillator is in balance and equal grid and plate currents are drawn by the two tubes 21 and 22. The potentiometer 29 may be adjusted to compensate for variation in the coils 11 and 12 and in the tubes and tube circuits so that equal space currents are drawn when the armature 14 is in a predetermined mid-position. The potentiometer 44 may be adjusted to compensate for variations in the resistors 42 and 43 so that equal potentials are developed at opposite ends of the resistor network 42, 43, 44 when the tubes are in balanced operating condition as above mentioned.

For indicating any unbalance in the operation of the two tubes, an indicating instrument 60 is provided which may comprise the center indicating millivoltmeter and which is connected to a tap 61 of a potentiometer 62. The potentiometer 62 is connected in series with a choke 63 across the resistor assembly 42, 43, 44. The potentiometer 62 thus provides a control for adjusting the sensitivity of the instrument 60.

With the armature 14 in its mid-position the push-pull oscillator is in balanced operating condition and equal grid currents are drawn by the two tubes thereby producing equal biases across the resistors 25 and 26. However, when the armature 14 is displaced from mid-position, the tuning of the grid circuits of the tubes 21 and 22 is changed and the tubes are caused to draw unequal grid currents, thereby producing unequal voltage drops across the respective grid leak resistors 25 and 26 and causing the tubes to pass unequal space currents, producing a voltage differential across the resistor network 42, 43 and 44 which is indicated on the instrument 60.

In accordance with the present invention, the negative ends of the resistors 25 and 26 are connected respectively by lines 65 and 66 to potentiometers 67 and 68, having variable taps 69 and 70 which are connected respectively by lines 71 and 72 to grids 73 and 74 of amplifier tubes 75 and 76 respectively. Potential sources 77 and 78 are connected across the potentiometers 67 and 68 to produce potential drops, an adjustable portion of which may be applied to the grids 73 and 74 for controlling the bias thereof.

The tubes 75 and 76 are provided with plates 80 and 81 which are connected by lines 82 and 83 to resistors 84 and 85 respectively and thence by lines 86 and 87 to a source of plate potential 88, the negative terminal of which is connected to a line 89 interconnecting the cathodes 90 and 91 of the tubes 75 and 76. The cathodes are also connected by a line 92 to the cathode side of the resistor 27.

The oscillator circuits comprise a pair of tubes 100 and 101 having grids 102 and 103 and cathodes 104 and 105 connected respectively across tuned circuits comprising coils 106 and 107 and condensers 108 and 109. The cathodes 104 and 105 are joined by the lines 86 and the resistors 84 and 85 are connected in the grid return sides of the coils 106 and 107 to constitute sources of grid biasing potential. The resistors 84 and 85 are by-passed for alternating currents by condensers 110 and 111 which introduce the proper time constant to prevent erratic operation.

Tubes 100 and 101 are also provided with plates 114 and 115 which are connected respectively through feed-back coils 116 and 117 to a line 118 and thence through a secondary 119 of a transformer 120 and a relay coil 121 and line 122 to the cathode lead 86. The transformer 120 is provided with a primary 123 which is connected to a suitable source of alternating current and is adapted to supply a suitable alternating potential to the anodes 114 and 115. A by-pass condenser 124 is connected between the line 118 and the cathode lead 86. This condenser must be of a size to bypass the high frequency component of the plate current without introducing an excessive load on the secondary 119. The relay coil 121 is by-passed by a condenser 125 to eliminate the effect of pulsating D. C. on the relay coil.

The feedback coils 116 and 117 are conductively associated with the coils 106 and 107 and are adjusted to cause the respective tubes 100 and 101 to oscillate at a frequency determined by the constants of the circuit including the tuned circuits 106, 108 and 107, 109. Gas glow lamps 130 and 131 are connected across the coils 116 and 117 respectively and are of a type to glow when energized by the oscillations in the respective oscillating circuits.

The relay coil 121 is provided with an armature 132 having back contacts 133 which are normally closed and close a circuit from a secondary 134 of the transformer 120 to a signal lamp or the like 135.

In the operation of this system, beginning with the tubes 100 and 101, the feed back coils 116 and 117 are so adjusted that the tubes are in oscillating condition with a predetermined grid bias. The resistors 84 and 85 are connected in the space current circuits of the amplifier tubes 75 and 76 so that the flow of space current through the resistors increases the negative bias on the grids 102 and 103 and the adjustment is such that when this space current exceeds a predetermined value, the negative bias on the grids 102 and 103 will be sufficient to block the respective tubes and prevent oscillation thereof.

As previously pointed out, the operation of the tubes 21 and 22 produces a negative bias across the resistors 25 and 26 which is equal and of a predetermined value when the armature 14 is in its mid-position. This negative potential is supplied by the lines 65 and 66 respectively to the grids 73 and 74 of the amplifier tubes 75 and 76. The value of this potential is adjusted by means of the potentiometers 67 and 68 to a value such that the space current passed by the tubes 75 and 76 when the armature 14 is in a mid-position is just sufficient to produce the biasing potential in the resistors 84 and 85 suited to block the tubes 100 and 101 and prevent oscillation thereof. Consequently, with the armature 14 in a mid-position, neither of the tubes 100 or 101 is in oscillating condition and the space current drawn by these tubes is insufficient to operate the relay coil 121. Hence the back contact 133 remains closed to energize the signal 135 which may, for example, constitute a green light and indicates that the part being measured is within the predetermined limits of tolerance.

When the armature 14 is shifted in one direction or the other by a predetermined amount, the operation of the tubes 21 and 22 becomes unbalanced so that one tube draws more grid current than the other and causes a corresponding change in the voltage drops across the resistors 25 and 26. Hence the grid bias on one of the amplifier tubes 75 and 76 increases and on the other tubes decreases. If, for example, the grid bias on the tube 75 is increased, the space current drawn by the tube will decrease and will thereby cause a decrease in the bias on the grid 102 which permits the tube 100 to go into oscillation. When the tube 100 goes into oscillation, the glow lamp 130 is lighted, thereby indicating that the part being measured varies from the standard by an amount exceeding the limit of tolerance on either the high side or the low side as the case may be, and the operator may accordingly segregate the parts into the proper group.

Under the conditions above stated, the bias on the amplifier tube 76 is decreased, thereby permitting the tube 76 to draw an increased current and increasing the negative bias on the grid 103 of the tube 101. This, however, does not change the operation as the tube 101 is already blocked.

If the armature 14 is moved in the opposite direction, the tube 100 will remain blocked and tube 101 will be allowed to oscillate, thereby lighting the glow lamp 131 and indicating that the size of the part exceed the limit of tolerance in the other direction.

When either of the tubes 100 or 101 is in oscillating condition space current is drawn which passes through the relay coil 121 and opens the contact 133, thereby extinguishing the indicator 135. It is thus evident that by observation of the indicators 130, 131 and 135 an unskilled operator is able to determine at a glance whether the part meets the predetermined requirements or whether it is undersized or oversized by an amount in excess of a limit of tolerance. When there is no part on the measuring bench the stylus and the armature 14 will take its full lower position and one or the other of the indicators 130 or 131 will be energized. Hence, the indicator 135 will only be energized when a part of the proper dimension is being measured.

It is to be understood that the limit indicating circuit including the amplifier tubes 75 and 76 and oscillator tubes 100 and 101 may be useful in various places where minute changes in potential are to be measured, for example, in photoelectric control, thermocouple systems or sensitive follow-up systems. The potential to be measured in each instance will be connected between the lines 65 and 66 respectively and the return line 92 forming the input to the amplifier tubes 75 and 76.

Individual relays may of course be included in the respective plate circuits of the tubes 100 and 101 to actuate any desired control or follow-up mechanism.

In the system disclosed if the part exceeds the limit of tolerance as indicated by the energization of either the indicator 130 or the indicator 131 the amount of variation may be observed on the indicating instrument 60. However if such indication is not required the instrument 60, together with the measuring circuit including the choke 63 and the potentiometer 62, may be omitted.

It will be noted that the alternating voltage on the plates of the tubes 100 and 101 prevents the tubes from going into sustained oscillation and thereby makes the operation subject to accurate control by the grid bias potentials. This feature permits the potentials to be adjusted in accordance with the desired measurements and causes the operation of the oscillator tubes to be extremely stable.

Although a specific embodiment of the invention has been shown for purposes of illustration, it is to be understood that various changes and adaptations may be made therein as will be apparent to a person skilled in the art. The invention is only to be limited in accordance with the scope of the following claims.

What is claimed is:

1. A microlimit indicating system for making micromeasurements, comprising a measuring head having a pair of variable impedance elements the impedance of which is varied in an inverse sense in response to variations in the quantity being measured, a measuring circuit connected for balanced operation when said variable impedance elements are of predetermined impedance, means responsive to variations in said impedances to unbalance the operation of said circuit, a pair of oscillators, means normally blocking said oscillators and means connecting said circuit to control the operation of said oscillators so that one or the other of said oscillators becomes unblocked in response to a predetermined unbalance in the operation of said circuit, and indicating means responsive to the operation of said oscillators.

2. A microlimit indicating system for making micromeasurements, comprising a measuring head having a pair of variable impedance elements the impedance of which is varied in an inverse sense in response to variations in the quantity being measured, a measuring circuit connected to said head comprising a pair of space discharge devices connected for balanced operation when said variable impedance elements are of predetermined impedance, means responsive to variations in said impedances to unbalance the operation of said devices, means responsive to the operation of said devices to produce corresponding control voltages, a pair of oscillators, means responsive to said control voltages to control the operation of said oscillators so that one or the other of said oscillators is rendered operative in response to a predetermined unbalance in the operation of said devices, and indicating means responsive to the operation of said oscillators.

3. A microlimit indicating system for making micromeasurements, comprising a measuring head having a pair of variable impedance elements the impedance of which is varied in an inverse sense in response to variations in the quantity being measured, a measuring circuit connected to said head comprising a pair of space discharge devices connected for balanced operation when said variable impedance elements are of predetermined impedance, means responsive to variations in said impedances to unbalance the operation of said devices, means responsive to the operation of said devices to produce corresponding control voltages, a pair of oscillators, means normally blocking said oscillators, means responsive to said control voltages to unblock one or the other of said oscillators in response to a predetermined unbalance in the operation of said devices, and indicating means responsive to the operation of said oscillators.

4. A microlimit indicating system for making micromeasurements, comprising a measuring head having a pair of variable impedance elements the impedance of which is varied in an inverse sense in response to variations in the quantity being measured, a measuring circuit connected to said head comprising a pair of space discharge devices connected for balanced operation when said variable impedance elements are of predetermined impedance, means responsive to variations in said impedances to unbalance the operation of said devices, means responsive to the operation of said devices to produce corresponding control voltages, a pair of oscillators, means normally blocking said oscillators, means responsive to said control voltages to unblock one or the other of said oscillators in response to a predetermined unbalance in the operation of said devices, indicating means responsive to the operation of said oscillators, and indicating means operative when said oscillators are both blocked.

5. A microlimit indicating system for making micromeasurements, comprising a measuring head having a pair of variable impedance coils the impedance of which is varied in an inverse sense in response to variations in the quantity being measured, a measuring circuit connected to said head comprising a pair of space discharge devices, a tuned control circuit for each device including one of said coils, a feed back network cross connecting said devices for oscillating in unison in push pull relationship, resistances connected in circuit with said devices to develop control voltages, which vary in response to variations in the impedances of said coils, a pair of space discharge oscillators connected to be controlled by said control voltages in a sense to be blocked when said variable impedances have predetermined values and to be selectively rendered operative in response to a predetermined unbalance in said impedances, and means responsive to the operation of said oscillators.

6. A microlimit indicating system for making micromeasurements, comprising a measuring head having a pair of variable impedance coils the impedance of which is varied in an inverse sense in response to variations in the quantity being measured, a measuring circuit connected to said head comprising a pair of space discharge devices, a tuned control circuit for each device including one of said coils, a feed back network cross connecting said devices for oscillating in unison in push pull relationship, resistances connected in circuit with said devices to develop control voltages, which vary in response to variations in the impedances of said coils, a pair of space discharge amplifiers having inputs responsive to said control voltages and having space current circuits including resistors to develop second control voltages, a pair of space discharge oscillators connected to be controlled by said second control voltages in a sense to be blocked when said variable impedances have predetermined values and to be selectively rendered operative in response to a predetermined unbalance in said impedances, and means responsive to the operation of said devices.

7. A microlimit indicating system for making micromeasurements, comprising a measuring head having a pair of variable impedance coils the impedance of which is varied in an inverse sense in response to variations in the quantity being measured, a measuring circuit connected to said head comprising a pair of space discharge devices, a tuned control circuit for each device including one of said coils, a feed back network cross connecting said devices for oscillating in unison in push pull relationship, means connected in circuit with said devices to develop control voltages, which vary in response to variations in the impedances of said coils, a pair of space discharge oscillators connected to be controlled by said control voltages in a sense to be blocked when said variable impedances have predetermined values and to be selectively rendered operative in response to a predetermined unbalance in said impedances, and means responsive to the operation of said oscillators.

8. A microlimit indicating system for making micromeasurements, comprising a measuring head having a pair of variable impedance coils the impedance of which is varied in an inverse sense in response to variations in the quantity being measured, a measuring circuit connected to said head comprising a pair of space discharge devices, a tuned control circuit for each device including one of said coils, a feed back network cross connecting said devices for oscillating in unison in push pull relationship, means connected in circuit with said devices to develop control voltages, which vary in response to variations in the impedances of said coils, a pair of space discharge amplifiers having inputs responsive to said control voltages and having space current circuits including means to develop second control voltages, a pair of space discharge oscillators connected to be controlled by said second control voltages in a sense to be blocked when said variable impedances have predetermined values and to be selectively rendered operative in response to a predetermined unbalance in said impedances, and means responsive to the operation of said oscillators.

9. A microlimit indicating system for making micromeasurements, comprising a measuring head having a pair of variable impedance coils the impedance of which is varied in an inverse sense in response to variations in the quantity being measured, a measuring circuit connected to said head comprising a pair of space discharge devices, a tuned control circuit for each device including one of said coils, a feed back network cross connecting said devices for oscillating in unison in push pull relationship, resistances connected in circuit with said devices to develop control voltages, which vary in response to variations in the impedances of said coils, a pair of space discharge oscillators connected to be controlled by said control voltages in a sense to be blocked when said variable impedances have predetermined values and to be selectively rendered operative in response to a predetermined unbalance in said impedances, and glow lamps connected to be actuated by said oscillators.

10. A microlimit indicating system for making micromeasurements, comprising a measuring head having a pair of variable impedance coils the impedance of which is varied in an inverse sense in response to variations in the quantity being measured, a measuring circuit connected to said head comprising a pair of space discharge devices, a tuned control circuit for each device including one of said coils, a feed back network cross connecting said devices for oscillating in unison in push pull relationship, resistances connected in circuit with said devices to develop control voltages, which vary in response to variations in the impedances of said coils, a pair of space discharged oscillators connected to be controlled by said control voltages in a sense to be blocked when said variable impedances have predetermined values and to be selectively rendered operative in response to a predetermined unbalance in said impedances, glow lamps connected to be actuated by said oscillators, and a signal circuit actuated when neither of said oscillators is operating.

11. A microlimit indicating system for making micromeasurements, comprising a measuring head having a pair of variable impedance coils the impedance of which is varied in an inverse sense in response to variations in the quantity being measured, a measuring circuit connected to said head comprising a pair of space discharge devices, a tuned control circuit for each device including one of said coils, a feed back network cross connecting said devices for oscillating in unison in push pull relationship, resistances connected in circuit with said devices to develop control voltages, which vary in response to variations in the impedances of said coils, a pair of space discharge amplifiers having inputs responsive to said control voltages and having space current circuits including resistors to develop second control voltages, a pair of space discharge oscillators connected to be controlled by said second control voltages in a sense to be blocked when said variable impedances have predetermined values and to be selectively rendered operative in response to a predetermined unbalance in said impedances, said oscillators comprising space discharge devices having anodes, means supplying an alternating voltage to said anodes to prevent sustained oscillations and render the operation responsive to said second control voltages, and means responsive to the operation of said oscillators.

12. A microlimit indicating system comprising a variable impedance element, the impedance of which is varied in response to variations in the quantity being measured, a measuring circuit connected for balanced operation when said variable impedance element is of predetermined impedance, means responsive to variations in the impedance of said element to unbalance the operation of said circuit, a pair of oscillators, means normally blocking said oscillators and means connecting said circuit to control the operation of said oscillators so that one or the other of said oscillators becomes unblocked in response to a predetermined unbalance in the operation of said circuit, and indicating means responsive to the operation of said oscillators.

13. A microlimit indicating system for making micromeasurements, comprising a variable impedance element, the impedance of which is varied in response to variations in the quantity being measured, a measuring circuit connected to said impedance element to develop a control voltage which varies in response to variations in the impedance of said element, a pair of space discharge oscillators connected to be controlled by said control voltage in a sense to be blocked when said variable impedance has a predetermined value and to be selectively rendered operative in response to predetermined variations in said impedance, glow lamps connected to be actuated by said oscillators, and a signal circuit actuated when neither of said oscillators is operating.

CHARLES F. COAKE.

REFERENCES CITED

The following references are of record in the file of this patent:

UNITED STATES PATENTS

| Number | Name | Date |
|---|---|---|
| 2,181,568 | Kotoroski | Nov. 28, 1939 |
| 2,225,046 | Hunter | Dec. 17, 1940 |
| 1,989,510 | Fitzgerald | Jan. 29, 1935 |
| 2,060,988 | Hansell | Nov. 17, 1936 |
| 1,809,683 | FitzGerald | June 9, 1931 |
| 1,913,148 | Alexanderson | June 6, 1933 |
| 2,153,986 | MacLaren, Jr. | Apr. 11, 1939 |